United States Patent
Bietz

(10) Patent No.: US 12,508,452 B2
(45) Date of Patent: Dec. 30, 2025

(54) MULTIFUNCTIONAL RESPIRATORY PROTECTIVE FACE MASK

(71) Applicant: ZVerse, Inc., West Columbia, SC (US)

(72) Inventor: Steven Bietz, Cumming, GA (US)

( * ) Notice: Subject to any disclaimer, the term of this patent is extended or adjusted under 35 U.S.C. 154(b) by 803 days.

(21) Appl. No.: 17/228,693

(22) Filed: Apr. 12, 2021

(65) Prior Publication Data
US 2022/0323799 A1 Oct. 13, 2022

(51) Int. Cl.
| | | |
|---|---|---|
| *A62B 18/02* | (2006.01) | |
| *A41D 13/11* | (2006.01) | |
| *A61M 16/06* | (2006.01) | |
| *A62B 23/02* | (2006.01) | |

(52) U.S. Cl.
CPC .......... *A62B 18/02* (2013.01); *A41D 13/1161* (2013.01); *A61M 16/06* (2013.01); *A62B 23/02* (2013.01)

(58) Field of Classification Search
CPC ......... A62B 18/00; A62B 18/02; A62B 23/02; A62B 23/025; A41D 13/11–1192; A61M 16/06–0655; A61M 2016/0661
See application file for complete search history.

(56) References Cited

U.S. PATENT DOCUMENTS

| | | | |
|---|---|---|---|
| 4,849,145 A | 7/1989 | Hirsch | |
| 5,053,179 A | 10/1991 | Masui et al. | |
| 10,835,704 B1 * | 11/2020 | Heimbuch | A61M 16/1065 |
| 11,759,581 B2 * | 9/2023 | Power | A61M 15/0085 |
| | | | 128/200.14 |
| 2009/0176051 A1 * | 7/2009 | Eifler | A62B 18/08 |
| | | | 264/261 |
| 2012/0285455 A1 * | 11/2012 | Varga | A61M 16/0683 |
| | | | 128/204.21 |
| 2013/0291876 A1 * | 11/2013 | Angadjivand | B01D 39/083 |
| | | | 156/276 |

(Continued)

FOREIGN PATENT DOCUMENTS

| | | | | |
|---|---|---|---|---|
| JP | 2654623 | | 7/1989 | |
| WO | WO-2020079055 A1 * | | 4/2020 | A61K 31/569 |

(Continued)

OTHER PUBLICATIONS

Translation of WO-2021255187-A1. Accessed from Espacenet Oct. 2, 2023. (Year: 2021).*

(Continued)

*Primary Examiner* — Paige Kathleen Bugg
(74) *Attorney, Agent, or Firm* — Jong Patent Firm; Cheng Ning Jong; Louis Reale

(57) ABSTRACT

One embodiment of the present invention provides a multifunctional face mask system adapted to receive a nebulizer system, enabling a user to be treated by a nebulizer medication, while simultaneously providing a hygienic barrier between the user and their external environment via at least one filter component. The present invention further provides a multifunctional face mask system that is self-supporting, thereby enabling a user to wear the mask system in a portable manner. The present invention, in other embodiments, includes the bonding between at least one filter component and its corresponding filter window, to be produced by a selective mold behind injection molding process.

20 Claims, 14 Drawing Sheets

(56) References Cited

U.S. PATENT DOCUMENTS

| | | | | |
|---|---|---|---|---|
| 2015/0108682 A1* | 4/2015 | Spear | .................... | B01D 27/08 |
| | | | | 264/263 |
| 2020/0155877 A1* | 5/2020 | Key | ....................... | A41D 13/11 |
| 2021/0330912 A1* | 10/2021 | Groman | ................ | A61M 16/06 |
| 2021/0331007 A1* | 10/2021 | Cresswell | .............. | B01D 46/52 |
| 2021/0402121 A1* | 12/2021 | McAuley | ............ | A61M 16/109 |
| 2022/0096876 A1* | 3/2022 | Dalton | ................. | A62B 18/025 |
| 2023/0142434 A1* | 5/2023 | Szasz | ..................... | A62B 23/02 |
| | | | | 128/206.12 |
| 2023/0173418 A1* | 6/2023 | Logothetidis | .......... | A62B 23/02 |
| | | | | 128/863 |
| 2023/0226383 A1* | 7/2023 | Sylliaasen | .............. | A62B 23/02 |
| | | | | 128/205.12 |

FOREIGN PATENT DOCUMENTS

| | | |
|---|---|---|
| WO | WO-2021038311 A1 * | 3/2021 |
| WO | WO-2021255187 A1 * | 12/2021 |
| WO | WO-2022122976 A1 * | 6/2022 |
| WO | WO-2022127991 A1 * | 6/2022 |
| WO | WO-2022185271 A2 * | 9/2022 |

OTHER PUBLICATIONS

Translation of WO-2022127991-A1 Accessed from Espacenet Oct. 2, 2023. (Year: 2022).*
NIOSH Anthropometric Data and ISO Digital Headforms, www.cdc.gov/niosh/npptl/topics/respirators/headforms.

* cited by examiner

MULTIFUNCTIONAL RESPIRATORY PROTECTIVE FACE MASK

FIELD OF THE INVENTION

The present invention relates to protective face mask systems, particularly systems directed to air respiration filtering. More specifically, one aspect of the present invention is directed to portable protective face masks capable of dispensing a nebulizer type medication.

BACKGROUND OF THE INVENTION

The function of a typical protective type face mask is to provide a hygienic barrier between a user and the user's external environment. The primary focus of the discussion will be on face masks configured to directly protect the respiratory system, which includes mask configurations that cover both the nose and mouth. Depending on the features provided by the mask, it can protect the user from their environment, protect objects/substances in the environment from the user, protect other people/animals in the environment from the user, or any combination thereof. Filtration of the contaminants of interest, the amount and type, is primarily determined by the properties of the filter component utilized in the given face mask system.

During the approximate time period between late 2019 and early 2020, humankind was introduced to the COVID-19 virus. As a first line of defense, healthcare professionals as well as like-minded professionals and organizations, quickly provided the public with basic protective measures, such as: avoiding crowds, having unmasked individuals maintain a distance of at least 6 feet away from others, wearing a mask in public settings or when requested, in situations where conforming to Social Distancing guidelines is not possible, and especially when individuals exhibit COVID-19 virus symptoms. Virtually all health organizations highly recommend that certain individuals persistently wear masks; for example, those with compromised immune systems, preexisting medical conditions, healthcare professionals working in patient filled environments, and the like. Additional situations where individuals may be required to persistently don masks, include, those having duties that require interactions with articles or substances that are being processed for the public, such as operators engaged in dispensing medications, food preparation, library services, general delivery services, and the like.

There are several factors which determine when a face mask should be replaced. These factors primarily depend on the mask's design, its intended use, and are predominantly based on the quality of materials that comprise the mask. Face masks fabricated from higher quality materials and corresponding like processes, will generally perform to a higher standard, as well as enjoy a longer life expectancy when compared to their lower quality counterparts. Of course, situations exist that demand immediate mask replacement, for example, when a face mask becomes soiled by a user, becomes contaminated by the user's environment, e.g., dropped, becomes damaged, shows signs of material/component failures—such as broken strap, tear in the filter; or is compromised in any substantial manner.

Because of the high rate of consumption, costs are an important factor when selecting which type of mask to recommend/purchase, given a specific application. Reusable face masks can have a lower cost of ownership, since they can be washed and/or sanitized and put back in use. Yet, in other designs, the filter material portion of the mask can be replaced. However, such reusable face masks will typically command a premium price, since construction from higher quality, durable materials is necessary, in order to withstand the cleaning/recycling processes. These types of masks are typically more user friendly, comfortable, and produce a superior seal against the user's face due to the typical semi-ridged structure of such masks. Unfortunately, there are situations where salvaging a reusable face mask becomes undesirable, primarily associated with situations that introduce questionable risk factors. Such situations are many, and include occasions where a mask is substantially damaged, or a user introduces secretions from their nose and/or mouth into the face mask. This is especially problematic if the user is suffering from or is a carrier of illness causing microbes. Whether a user is contagious to others, is not always known, especially in emergency or time critical circumstances.

Furthermore, the processing to restore such masks to a state where they can be reused creates additional opportunities for illness-causing microbes to spread. Such problematic situations include, but are not limited to: handling used masks by others to replace or adjust mask components (filters, straps, etc.); contaminating sinks, faucets, dishwashers, washing machines, and the like, during the mask cleaning processes enabling cross contamination. Unfortunately, there are a multitude of scenarios where expensive, reusable face masks must be treated as a one-time use, disposable devices.

Disposable or single use face masks are typically the simplest, least expensive type of mask, which, because of modern-day manufacturing processes, tend to enjoy cost/volume benefits. Disposable face masks are typically thin and flimsy in nature. The reason being is they are almost entirely constructed from thin fabric or paper, which not only serves as the mask's support structure, but also functions as the filter component. Because of the mask's flimsy structure, these types of masks are typically less comfortable, and yield a weak seal against the user's face, which can easily result in blowout breaches to the side and back of the mask when a user is breathing out, significantly impacting protection to others.

These types of inexpensive mask designs permits the flimsy fabric/paper filter, from which the mask is constructed from, to tighten-up towards the mouth when breathing in and expand away from the mouth when breathing out. To the user, this creates an annoying low frequency oscillation of about 70 Hz. This excessive filter flexing permits the filter material to touch moist areas of the user's nose and mouth, which is not only irritating to the user, but can compromise the filtration material. Unlike the reusable mask, the single use face mask is disposed of after one use, virtually eliminating all the post-handling type hazards involved with rejuvenating a reusable mask.

In the hygienic face mask arts, it is apparent that there is a long felt need for face mask systems that incorporate the premium features of high-quality masks, e.g., semi-ridged, superior sealing to the users face, comfortable, non-oscillating, etc., with an associated price point that permits such units to be considered disposable, or single use masks. Furthermore, due to the variation of facial characteristics in the consumer population, there exists a long felt need for inexpensive, hygienic face masks that comfortably conform or adapt to a wide range of user's unique facial characteristics.

Again, in the present COVID-19 conscious environment, all types of healthcare face masks should be re-evaluated given the heighten awareness to stop or reduce the spread of such illness causing microbes. For example, the face masks used in nebulizer systems, which are typically used by people suffering from respiratory disorders, e.g., asthma, cystic fibrosis, and the like. A nebulizer system or nebulizer machine is used to deliver a medication, in fine mist form, to a patient. The medication, in mist form, is primarily inhaled via the mouth and taken directly into the lungs of the patient. A tube connects a face mask to the nebulizer machine. A typical nebulizer type of face mask is fabricated from a semi-rigid polymeric material, covers the user's mouth and nose, and is typically held in place by one or more elastic bands. The mask possesses unobstructed, unfiltered openings, which provides the user with a means for receiving air during inhalation, as well as providing expiration air a means of escape, via an uninterrupted path to the user's external environment. Having a patient exhale directly into their environment, clearly presents a potential hazard for those nearby. The situation is exacerbated by small treatment spaces and crowded conditions, not uncommon in clinical or hospital settings. Often, nebulizer systems are cumbersome, requiring a typical 120 VAC outlet to power the system; such limitations hinder the movement of the patient to more suitable, less crowded environments. It is apparent that there are areas for improvement in the nebulizing arts, given our heighten state of awareness to stop or reduce the spread airborne communicable diseases. Again, because typical nebulizer face mask possesses open, unrestricted, breathing holes, it permits the nebulizer medication to freely dissipate into the user's environment, thereby squandering the excess, unused medication, a substantial source of medication waste. Also, a hygienic barrier is not provided between the user and the user's external environment, providing a clear means for spreading of microorganisms, and the like, to others.

SUMMARY OF THE INVENTION

The present disclosure provides multifunctional face mask type systems directed to air respiration filtering. Presented are disclosures of face masks and methods of producing that overcome the aforementioned disadvantages of well-known devices and associated systems. The filtration components or materials utilized in the disclosed face mask systems are of the spunbonded, nonwoven variety, which are typically fabricated from polypropylene, polyester (PET), or polyethylene type of polymeric materials. One source of such spunbonded, nonwoven fabrics is the Yaolong Nonwoven company located in Shaoxing City, China; additional information on such fabrics, their properties, and corresponding manufacturing processes is available on their website (www.yaolongnonwoven.com). In the filter component selection process, there are several desirable material properties, which include, but not limited to: tear resistance, light weight, hydrophobic, soft to the touch, low melting temperatures—enabling sealing/welding to itself as well as other select polymeric materials, low resistance to air flow, low cost; and the like. These spunbonded, nonwoven type textiles possess virtually all of the aforementioned desirable properties, and more. Such materials are utilized in the disclosed face mask systems of the present invention.

The face mask systems of the present invention include a polymeric housing, which not only delineates the device's basic geometric structure, but also provides a bonding surface for the spunbonded, nonwoven fabric filter material. The means for attaching the spunbonded, nonwoven fabric filter material to the housing is generally directed to industry's In-Mold Lamination injection molding type processes, more specifically directed to the selective mold-behind injection molding processes. The mold-behind injection molding processes enables the placement and bonding of the filter component to the housing during the fabrication (injection molding) of the polymeric mask housing itself. Automating this crucial attachment step in the assembly of the face mask, eliminates subsequent processes and associated material and labor costs. For example, the cost of adhesives and the associated labor costs for staging and application. Additionally, it is well known that automation technology enjoys a high degree of manufacturing precision, especially when commissioned to perform repetitive tasks. Such automation not only reduces/eliminates the waste associated with defects due to human error, but also improves production rates and the cost-volume benefit, while providing a higher quality product.

Additional information on the In-Mold Lamination and the Selective Mold-Behind Injection molding processes can be found in: U.S. Pat. Nos. 5,053,179; 4,849,145; as well as Japanese patent JP2654623, which are all herein incorporated by reference in their entirety. In the event of inconsistent usages between this document and those documents so incorporated by reference, the usage in the incorporated reference(s) should be considered supplementary to that of this document; for irreconcilable inconsistencies, the usage in this document controls.

Accordingly, it is an object of the present invention to provide a multifunctional face mask system comprising a semi-ridged polymeric housing, having an outer edge perimeter for engaging the area encircling the user's nose and mouth.

It is another object of certain embodiments of present invention to provide a multifunctional face mask system capable of dispensing a nebulizer medication to a user, while simultaneously providing a hygienic barrier between the user and the user's external environment. The hygienic barrier is enabled by a filter component, which is selected to filter/eliminate or reduce the transmission of predetermined airborne microorganisms, and the like. In preferred embodiments the apparatuses are sufficiently light-weight and self-contained in operation, so to produce exceptionally portable systems.

It is yet another object of certain embodiments of present invention to attach at least one filter component to at least one housing filter window, by the application of an in-mold bond, produced by a selective mold behind injection molding process.

It is a further object of the present invention to provide a polymeric supplemental bead, creating a three-sided bond between the filter perimeter strip filter and the mask housing, via a selective mold behind injection molding process. This type of three-sided bond uses additional polymeric material which produces thicker members. In turn, such bonds ensure a strong, gap-free engagement between the two interfacing materials, which will safeguard against delamination, leakages, and the like.

It is another object of certain embodiments of present invention to provide a multifunctional face mask system where the mask system's inner volume creates an air permeable, yet substantially sealed environment, so to reduce the nebulizer medication waste, i.e., the unused medication normally escaping or exhausted into the user's surrounding environment.

It is a further object of the present invention to provide a filter portion of the face mask of present invention that is comprised of at least one layer of filtration fabric. Filter composites, that use more than one layer of filtration fabric, are attached to each other, such that the composite filter can be substantially handled and processed as a single object.

It is another object of certain embodiments of present invention to provide a multifunctional face mask system where the mask's housing possesses concave three panel assembly, comprised of right, left, and front sections or panels. Any combination of these sections can be fabricated to possess a thicker wall (when compared to top and bottom sections), thereby acting as a stiffening member. Additionally, the aforementioned polymeric supplemental beads are also stiffening members. Stiffening members provide several functions/benefits and are typically integrated as part of or added to any combination of sections (right, left, and front sections) comprising the three panel assembly It is yet another object of certain embodiments of present invention to provide a multifunctional face mask system comprising a strain redirection assembly; this feature or mechanism is integrated into the aforementioned concave three panel assembly. The strain redirection assembly allows mask housing to dynamically conform to a variety of headform dimensions. There exist many headform types in the worldwide adult population. The ability for the face mask to dynamically conform to the user is primarily determined by the strategic placement of the aforementioned stiffening members onto one or more members comprising the concave three panel assembly.

In general, an enhanced seal between the user and mask is produced when a mask elongates on a given axis, to accommodate the user. Additional information on the study of headform dimensions can be found on the CDC website, (www.cdc.gov/niosh/npptl/topics/respirators/headforms), entitled: "NIOSH Anthropometric Data and ISO Digital Headforms."

It is a further object of certain embodiments of present invention to provide a multifunctional face mask system comprising a housing outer edge perimeter configured to seal about the perimeter encircling the user's nose and mouth. Preferred embodiments include types of elongated, flexible, thin-walled lips, produced via tapered or reduced thickness perimeter edges and increased contact areas, which increases material flexibility, resulting in enhanced sealing. Other housing outer edge perimeter embodiments further include the use of an inboard flexible seal or an outboard flexible seal to provide additional sealing power.

It is another object of this invention to provide a relatively simple system that is economical from the viewpoint of the manufacturer and consumer, is susceptible to low manufacturing costs with regard to labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

Particular Advantages of the Invention

The present invention provides cost-effective, efficient solutions directed to respirator type of face masks. One focus of the present invention is to provide an aesthetically pleasing, comfortable face mask that possesses the look and feel of much more expensive face masks, but enjoy cost levels that are more in line with disposable, single use masks, thereby enabling them to be used as such. Additionally, the functionality of a face mask is primarily based on the following: the type of filter component(s), the fit of the mask on the user, and the breathability (resistance to air flow). Another focus of the present invention is to provide unique face mask systems that addresses and improve upon these, as well as other underdeveloped aspects directed to the face mask arts. Yet another aspect of the present invention is to provide a multifunctional face mask system that will more efficiently dispense a nebulizer medication, while simultaneously providing a hygienic barrier between the user and the user's external environment.

BRIEF DESCRIPTION OF THE DRAWINGS

The ensuing detailed description section makes reference to the annexed drawings. An enhanced understanding of the present invention will become evident when consideration is given to the detailed description thereof and objects other than the aforementioned become apparent. The invention will be described by reference to the specification and the annexed drawings, in which like numerals refer to like elements, and wherein.

DEFINITIONS OF TERMS USED IN THIS SPECIFICATION

Figure 1:
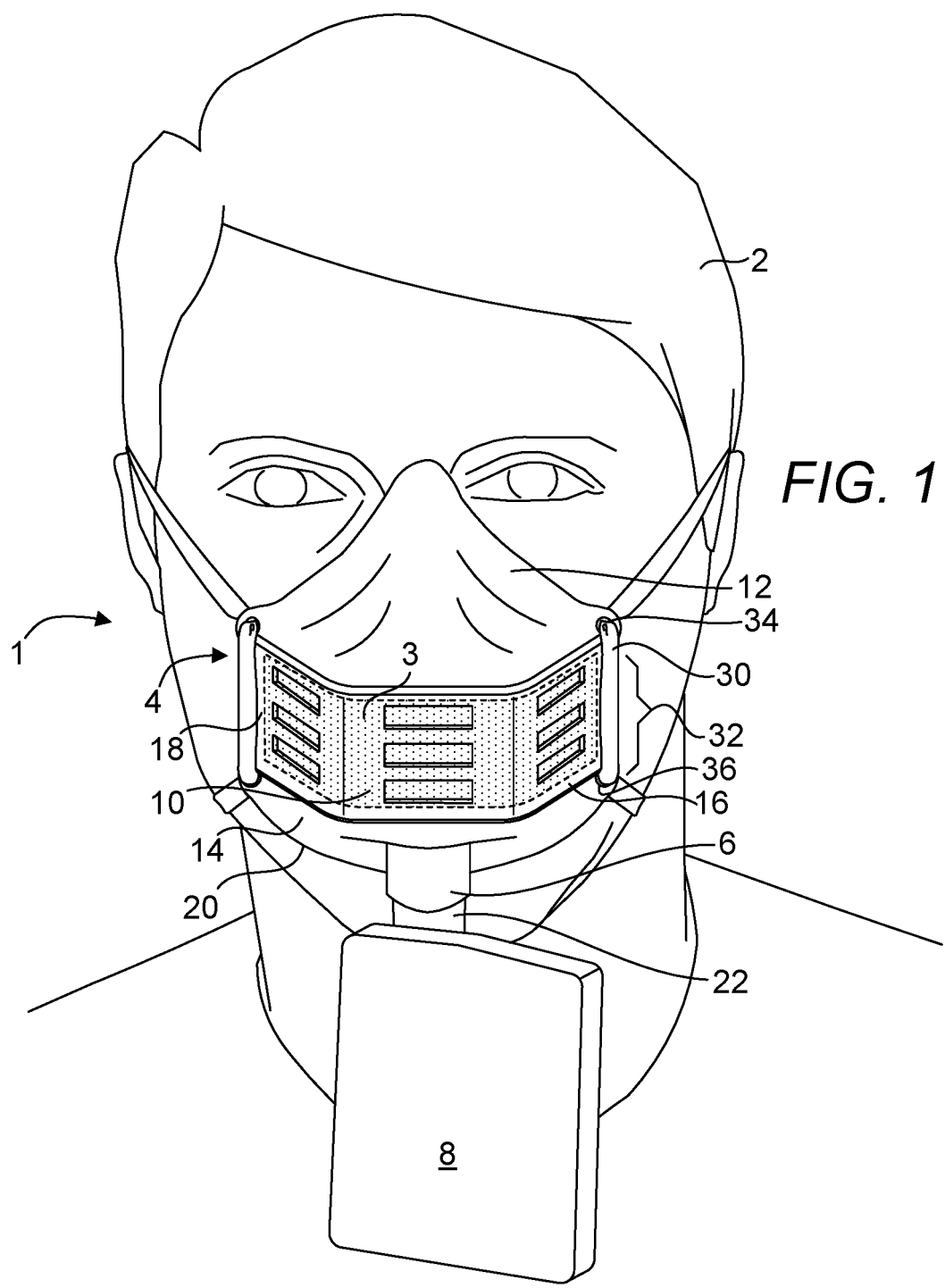
FIG. 1 illustrates a front perspective view of an embodiment of a multifunctional face mask system, affixed to a user. The system depicts a nebulizer system attached to the bottom section of the mask housing.

The portable protective facemask discussed throughout this disclosure shall have equivalent nomenclature, including, but not limited to: the device, the mask, the unit, the face mask system, the mask system, the system, the portable protective facemask comprising a nebulizer system, the present invention, or the invention. Additionally, the term exemplary shall possess a single meaning throughout this disclosure; wherein the sole focus is directed to serving as an example, instance, or illustration.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

PARTS/FEATURES LIST

1—multifunctional face mask system (bottom section nebulizer interface)
2—user
3—filter component
4—mask housing
6—housing receptacle (bottom section)
8—nebulizer system (bottom section interface)
10—front section
12—top section
14—bottom section
16—left-side section
18—right-side section
20—bottom edge
22—output port (bottom section interface)
30—left support strap
32—outer vertical length (left)
34—upper strap aperture (left)
36—lower strap aperture (left)
50—multifunctional face mask adapted to receive a nebulizer system
52—outer edge perimeter
54—plurality of apertures
60—top edge
62—right edge
64—left edge
70—upper chin
72—housing-nebulizer connection (bottom section interface)
80—nebulizer system (front section interface)
82—housing receptacle (front section)
84—output port (front section interface)
86—multifunctional face mask system (front section nebulizer interface)
88—bottom edge
90—housing-nebulizer connection (front section interface)
100—concave three panel assembly (subassembly of FIG. 1 system)
102—linking edge (right)
104—linking edge (left)
106—section thickness (wall thickness of right-side section 18)
108—section thickness (wall thickness of front section 10)
110—section thickness (wall thickness of left-side section 16)
112—three panel assembly and corresponding three filter components
120—right-side filter window (located on mask housing 4)
122—front filter window (located on mask housing 4)
124—left-side filter window (located on mask housing 4)
126—right filter component
128—front filter component
130—left filter component
132—right filter perimeter strip
134—front filter perimeter strip
136—left filter perimeter strip
150—three panel assembly and corresponding elongated single filter component 152—elongated filter window (located on mask housing 4)
154—elongated filter component (covers right, front, and left filter windows)
156—elongated filter perimeter strip
170—top surface (of elongated filter perimeter strip 154)
172—edge surface (of elongated filter perimeter strip 154)
174—bottom surface (of elongated filter perimeter strip 154)
176—housing filter window (approximate location)
178—polymeric supplemental bead (is a stiffening member & produces three-sided bond)
190—back-end
192—inner volume
194—outboard flexible seal
196—mask housing
198—inner volume wall
200—inboard flexible seal
210—basic face mask system
212—filter component

DETAILED DESCRIPTION

With reference to the drawings of the present invention, several embodiments pertaining to the faucet system of the present invention thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Terminology of similar import other than the words specifically mentioned above likewise is to be considered as being used for purposes of convenience rather than in any limiting sense.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" are all to be interpreted as open ended terms, are all considered equivalent terms, and are used interchangeably.

FIG. 1 illustrates a front perspective view of the multifunctional face mask system 1, affixed to user 2. The multifunctional face mask system 1, with attached filter component 3, presents one exemplary embodiment configured to provide a hygienic barrier between user 2 and the user's external environment, while user 2 is simultaneously treated by a nebulizer medication provided by nebulizer system 8.

Face mask system 1 includes mask housing 4, which is comprised of five contiguously connected sections, the sections include: top section 12, bottom section 14, right-side section 18, front section 10, and left-side section 16. Preferred face mask embodiments, incorporate mask housing 4 fabricated from a select few injection-moldable thermoplastic type materials, which also possess semi-rigid properties, such polymeric materials include, but are not limited to: TPU (thermoplastic polyurethane), TPE (thermoplastic elastomers), and the Polyvinyl family of polymers. Also depicted is filter component 3 bonded to all depicted housing sections, i.e., right-side section 18, front section 10, and left-side section 16.

Other face mask system embodiments incorporate mask housing 4 fabricated from thermoset materials, which include, but not limited to: silicone, polyurethane, and the like. It is imperative that mask housing 4 possess sufficient rigidity or strength, such that multifunctional face mask system 1, including the weight of nebulizer system 8, is self-supporting when worn by user 2. Whether the material comprising mask housing 4 is a thermoplastic or a thermoset material, configuring the unit from a transparent material is, in certain situations, is preferred. One advantage of transparent materials is that it allows the health care provider the ability to easily monitor the integrity of the inner volume of mask housing 4, as well as the condition of user's nose and mouth areas. Other, less preferred optical material options include translucent, opaque, colored, or dyed.

For simplicity, in the present embodiment, and all others presented in this discloser, the property of symmetry will be utilized. Accordingly, since mask housing 4 is substantially symmetrical about front section 10, component explanations and relationships directed to the left portion of mask housing 4, shall also apply to mirror image, right portion; and vice versa. Accordingly, outer vertical length 32 is depicted on the distal vertical edge of left-side section 16. In the present embodiment, the upper and lower portions of outer vertical length 32 include upper strap aperture 34 and lower strap aperture 36, respectively. Left support strap 30, engages both upper strap aperture 34 and lower strap aperture 36, producing a substantially uniform downward pressure along both left and right outer vertical lengths of mask housing 4. The uniform pressure applied along the vertical edges, not only promotes user comfort, but additionally helps prevent gap creating mask distortions—typically induced by single point strap attachment schemes. In preferred embodiments, support straps, such as Left support strap 30, are fabricated from elastic type of elongated materials, so to generate the appropriate holding forces.

Face mask system 1 comprises a means for attaching nebulizer system 8, having an output port 22 designed to removably engage with housing receptacle 6. Other embodiments include attachment schemes where nebulizer system 8 is permanently affixed to mask housing 4, including a delivery. In the present system, the means for transporting and dispensing a nebulizer medication to user 2 and the support means for supporting nebulizer system 8 is one in the same. Nebulizer system 8 includes its own means of power, and is further designed to be both compact and light weight; thereby creating face mask system 1 that is portable, which grants user 2 ample freedom of movement.

FIG. 2 illustrates a front view of multifunctional face mask adapted to receive a nebulizer system 50. FIG. 2 further elaborates on the fine points associated with mask housing 4. To support the present and subsequent explanations directed to the workings of mask housing 8, a Cartesian coordinate system (i.e., X-Y axes) has been superimposed over the mask housing depicted in FIG. 2. Accordingly, top edge 60 and bottom edge 20 are associated with the +Y and −Y axis, respectively; moreover, left edge 64 and right edge 62 are associated with the +X and −X axis, respectively.

Again referring to FIG. 2, depicted is one embodiment of a strain redirection assembly, comprised from a concave three panel assembly (i.e., right-side section 18, front section 10, and left-side section 16) in engagement cooperation with top section 12 and bottom section 14, and in further mechanical cooperation with at least one stiffening member (further delineated in discussions associated with FIGS. 8 and 14), is configured such that mask housing 4 provides enhanced sealing, for example: by increasing compressive pressure to user 2 from left-side section 16 and right-side section 18 when top section 12 and bottom section 14 are in tension; moreover, increasing compressive pressure to user 2 from top section 12 and bottom section 14 when left-side section 16 and right-side section 18 are in tension.

Mask housing 4 engagement to user 2 occurs via its perimeter or its contiguous outer most edge portion, and is herein referred to and depicted as outer edge perimeter 52. Outer edge perimeter 52 is comprised of four core components: top edge 60, which corresponds with the +Y axis; bottom edge 20, which corresponds with the −Y axis; left edge 64 which corresponds with the +X axis, and right edge 62 which corresponds with the −X axis. The transfer of forces to all aforementioned mask sections is understood to interface, or transfer via corresponding portions of outer edge perimeter 52.

Mask housing 4 depicts three sets of plurality of apertures 54, wherein each set 54 is comprised of three apertures. Right-side section 18 includes a plurality of apertures 54, as does front section 10, and left-side section 16. The apertures serve a variety of functions, including: providing a gateway to the user's external environment—serving as a means for receiving oxygen, supporting filter components, and the like.

Figure 2:
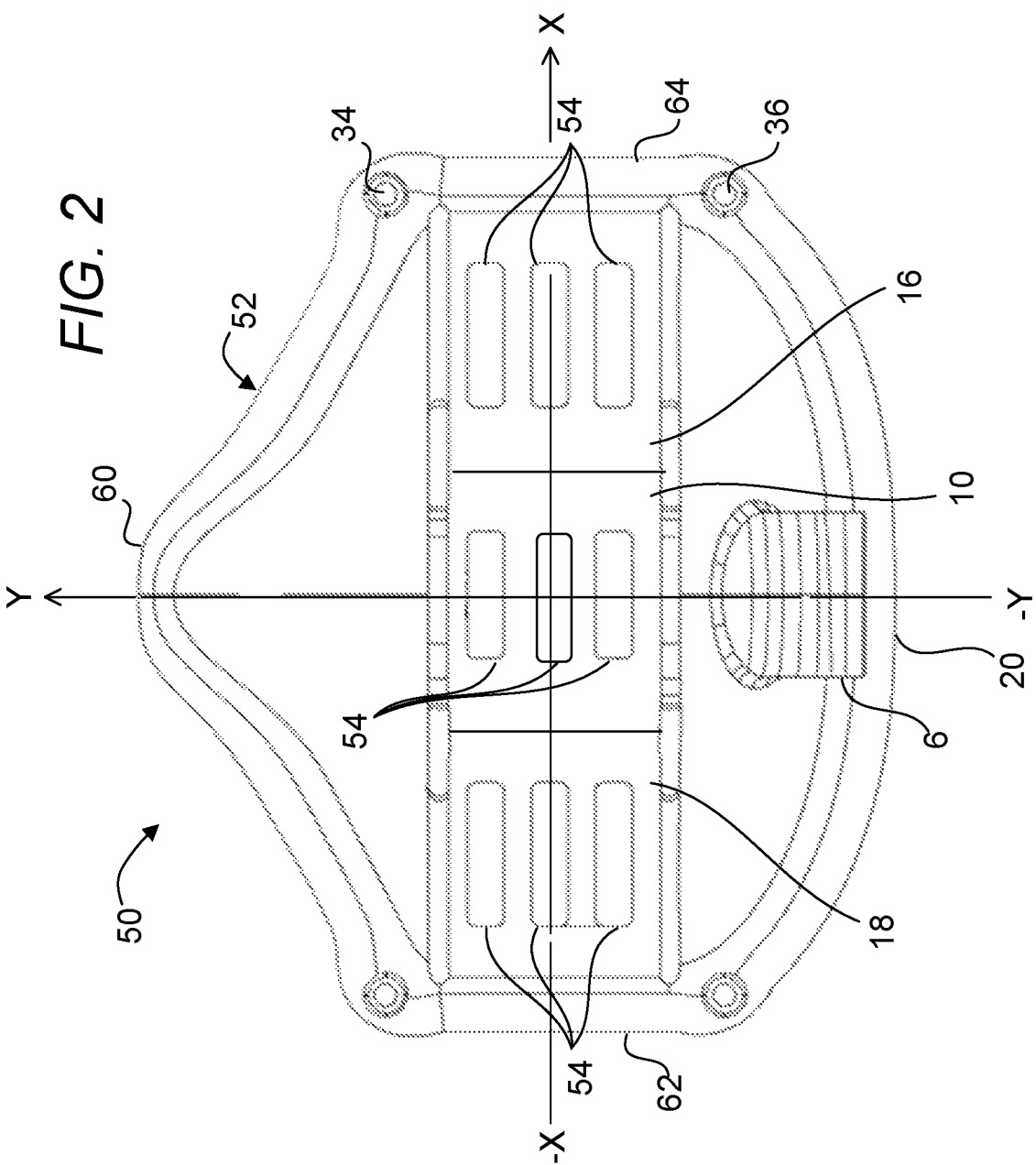
FIG. 2 illustrates a front view of multifunctional face mask system shown in FIG. 1, delineating the details of mask housing.
Figure 3:
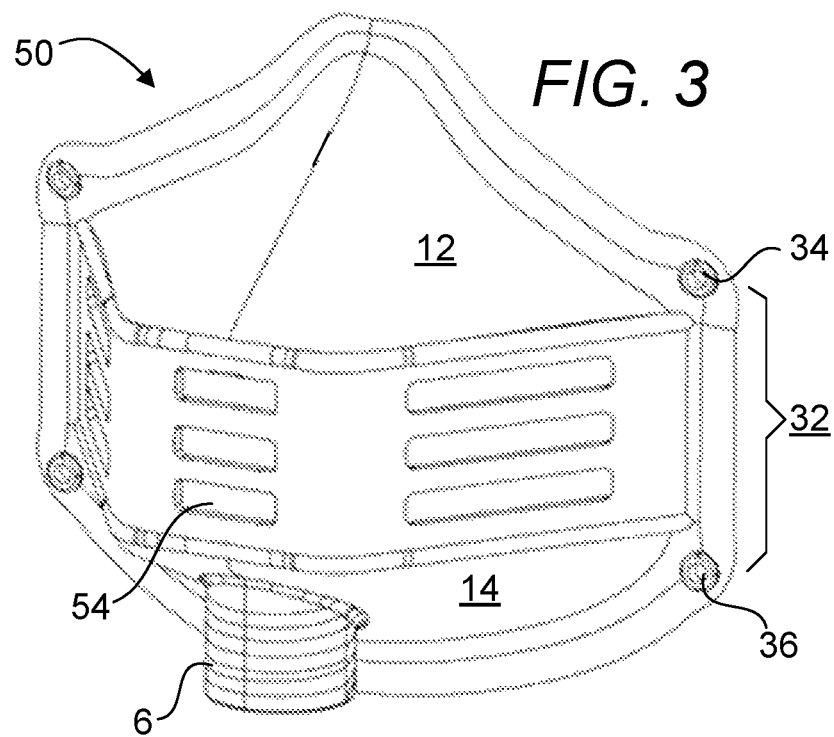
FIG. 3 illustrates a perspective top-left detailed view of multifunctional face mask system shown in FIG. 2.
Figure 4:
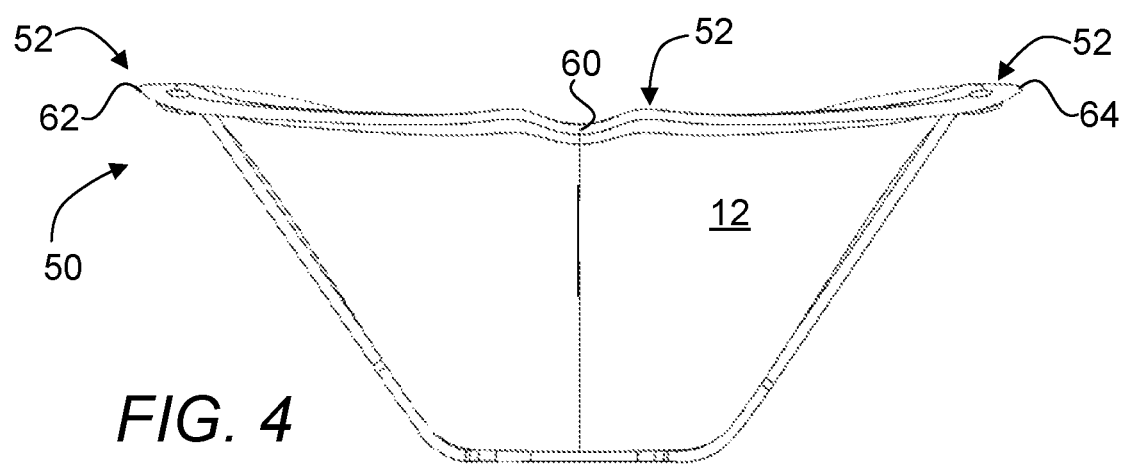
FIG. 4 illustrates a top view of multifunctional face mask system shown in FIG. 2.
Figure 5:
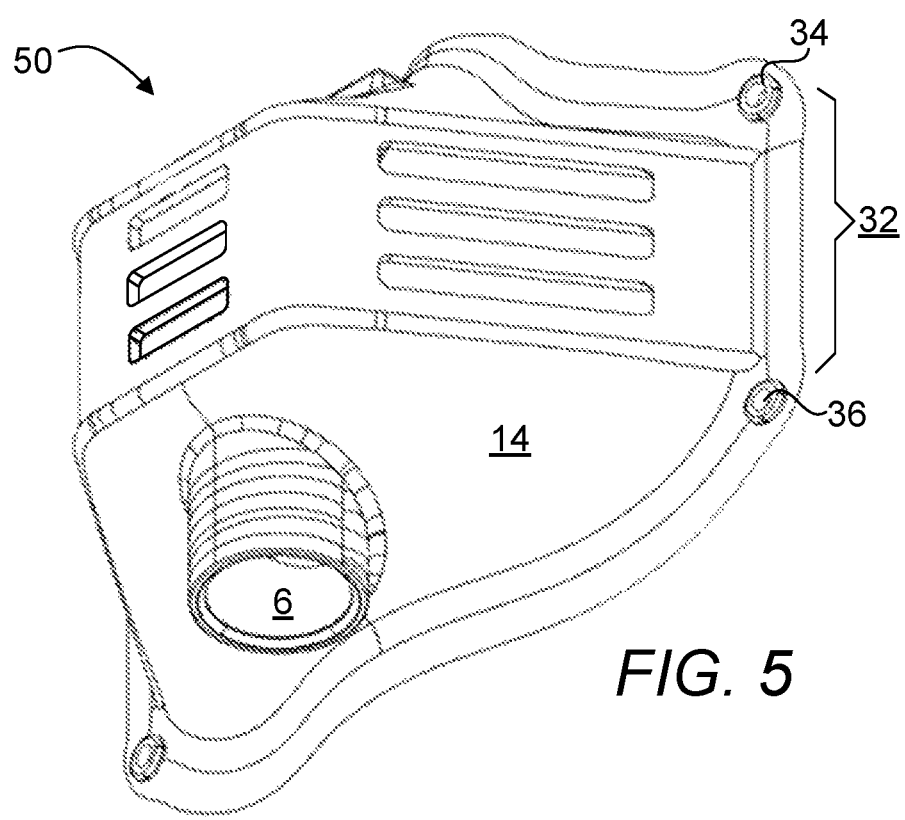
FIG. 5 illustrates a bottom-left perspective detailed view of multifunctional face mask system shown in FIG. 2.

FIGS. 3, 4, and 5 are various point of view depictions of the multifunctional face mask adapted to receive a nebulizer shown in FIG. 2. FIG. 3 illustrates a perspective top-left detailed view of multifunctional face mask system shown in FIG. 2. FIG. 5 illustrates a bottom-left perspective detailed view of multifunctional face mask system shown in FIG. 2. FIG. 5 illustrates a bottom-left perspective detailed view of multifunctional face mask system shown in FIG. 2. Again the illustrations depict provide various views of the device shown in FIG. 2, in order to provide a complete disclosure of the given embodiment under discussion.

Figure 6:
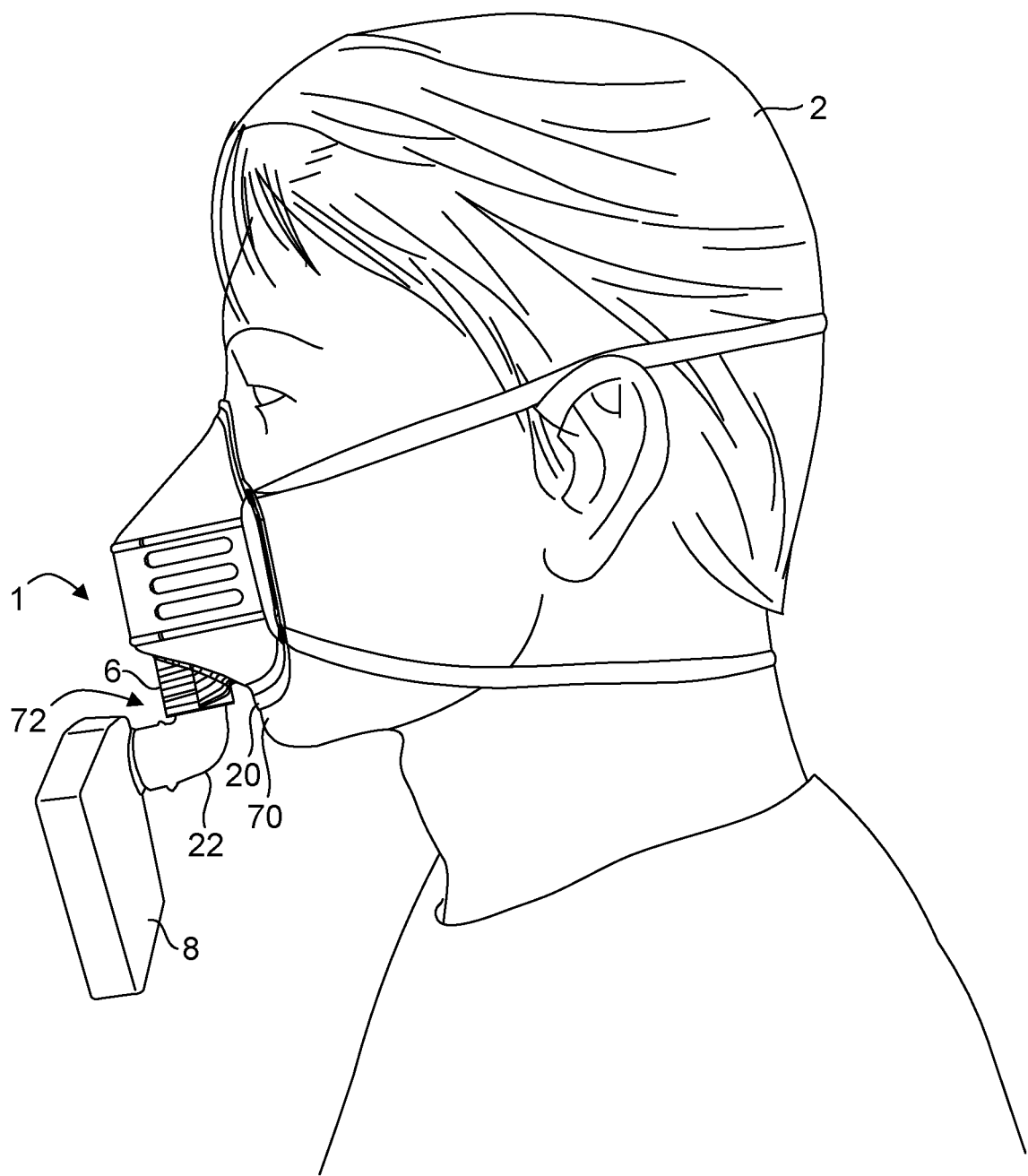
FIG. 6 illustrates a side perspective view of an embodiment of a multifunctional face mask system of FIG. 1, affixed to a user. The illustration depicts a nebulizer system attached to the bottom section of the mask housing.

FIG. 6 illustrates a side perspective view of the embodiment of the multifunctional face mask system shown in FIG. 1, affixed to a user. The illustration generally depicts nebulizer system 8 attached to the bottom section 14 of the mask housing 4. More specifically, housing-nebulizer connection 72 is comprised of nebulizer system 8 having output port 22, which is configured to deliver a nebulizer medication into mask housing 4, via housing receptacle 6. Housing-nebulizer connection 72 includes output port 22, which possesses a bend in the tubing. By way of example, but not limitation, the tube possesses a 90-degree bend, which not only yields a longer path, but also promotes turbulent air flow. Embodiments, having such substantial directional changes in the nebulizer medication flow paths, helps provide supplementary mixing of the nebulizer medication prior to utilization by user 2.

Mask housing 4 comprises bottom edge 20, which is configured to rest on user's 2 upper chin 70. The depicted embodiment utilizes the natural shelf-like geometry of the lower chin area to help support the weight of multifunctional face mask system 1. More specifically, the shelf-like portion of upper chin 70 is understood to lie on, or anywhere between the Mentolabial sulcus and the Pogonion facial landmarks.

Figure 7:
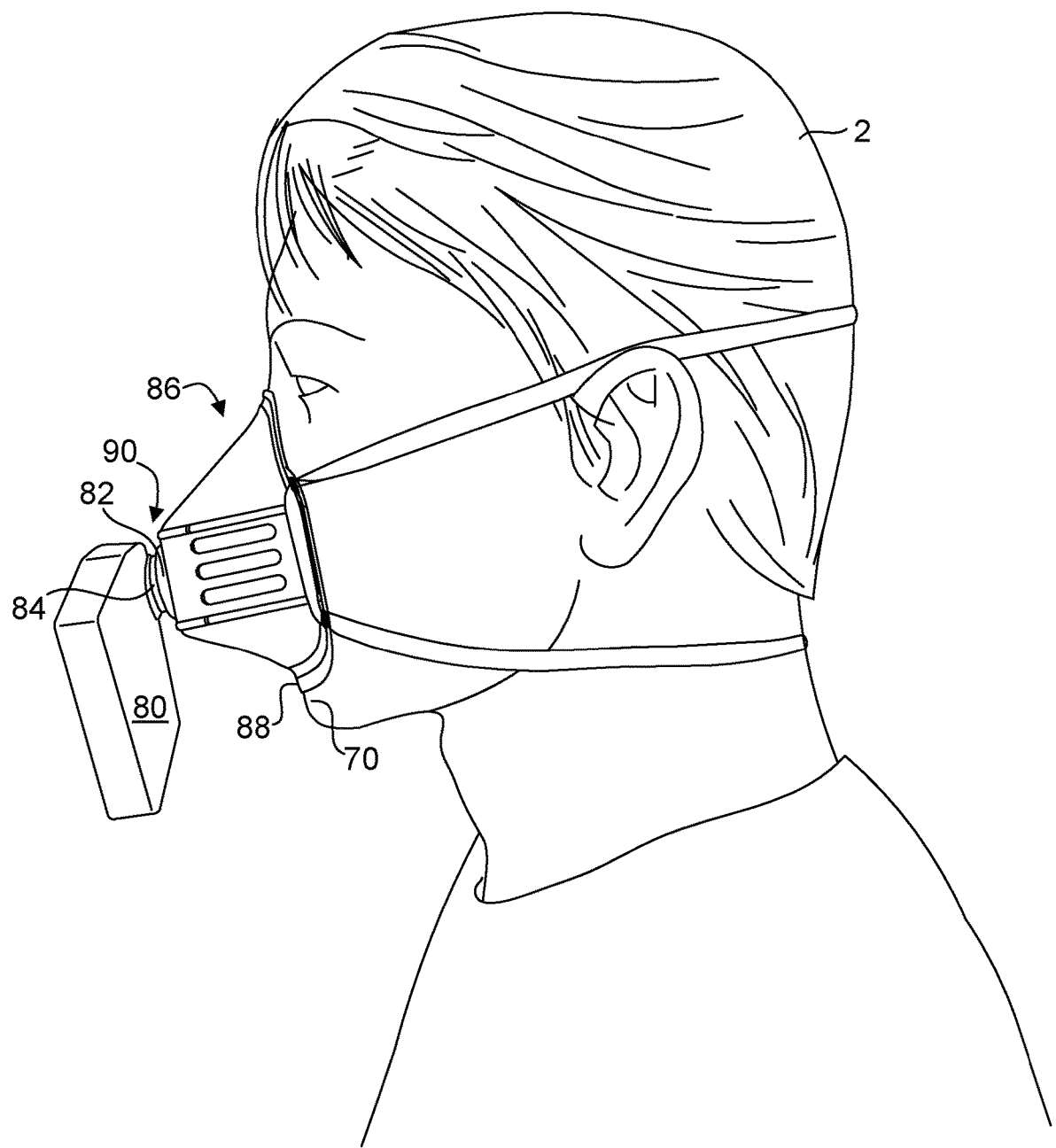
FIG. 7 illustrates a side perspective view of another embodiment of a multifunctional face mask system, affixed to a user. The illustration depicts a nebulizer system attached to the front section of the mask housing.

FIG. 7 illustrates a side perspective view of another embodiment of a multifunctional face mask system, affixed to a user. The illustration depicts a housing-nebulizer connection 90, wherein nebulizer system 80 having output port 84 is attached to the front section of multifunctional face mask system 86 via housing receptacle 82. The face mask system of FIG. 7 comprises a means for attaching nebulizer system 80 via housing-nebulizer connection 90. In one embodiment the connection can configured from a nebulizer system 80 having output port 84 designed to removably engage with housing receptacle 82. Other embodiments include combinations where nebulizer system 80 and associated connecting hardware is permanently affixed to multifunctional face mask system 86; including a delivery system for transporting and dispensing a nebulizer medication to user 2. Nebulizer system 80 includes its own means of power and is further designed to be both compact and light weight; thereby creating a face mask system that is substantially portable, granting user 2 ample freedom of movement.

Figure 8:
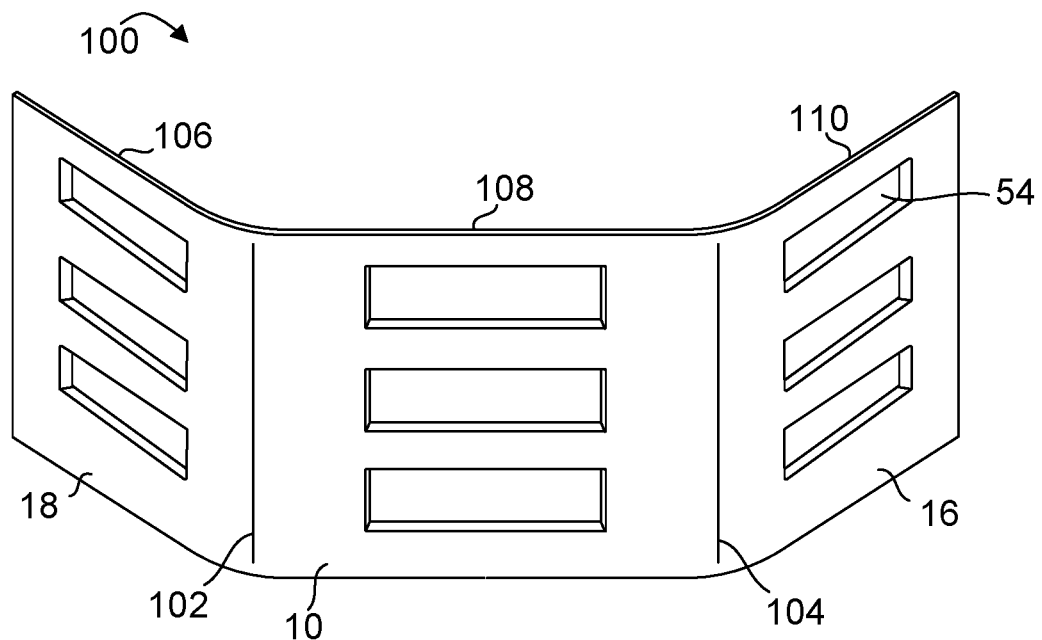
FIG. 8 illustrates a top-front detailed view of a concave three panel assembly; the depicted assembly is an integrated subassembly of the multifunctional face mask system shown in FIG. 1.

FIG. 8 illustrates a top-front view of concave three panel assembly 100 portion of the multifunctional face mask system shown in FIG. 1. Depicted are three contiguous, substantially planar sections, which are configured to form a curved or concave geometry. Connected to one side of front section 10, is right-side section 18, the two substantially planar sections meet at edge 102. Connected to the opposing side of front section 10, is left-side section 16, the two substantially planar sections meet at edge 104. In preferred embodiments, concave three panel assembly 100 is fabricated as one homogeneous unit. Capable manufacturing processes include selective mold behind injection molding type processes. Right-side section 18 possesses a substantially uniform section thickness 106. Front section 10 possesses a substantially uniform section thickness 108. Left-side section 16 possesses a substantially uniform section thickness 110. All section thicknesses (106, 108, and 110) are controllable via the associated fabrication process, e.g., by the corresponding selective mold behind injection molding type processes). In certain embodiments all section thicknesses (106, 108, and 110) are substantially equal. The thicknesses can be selected to be greater than the thicknesses associated with top section 12 and bottom section 14 to improve manufacturability with certain processes, such as a selective mold behind injection molding type process.

Figure 14:
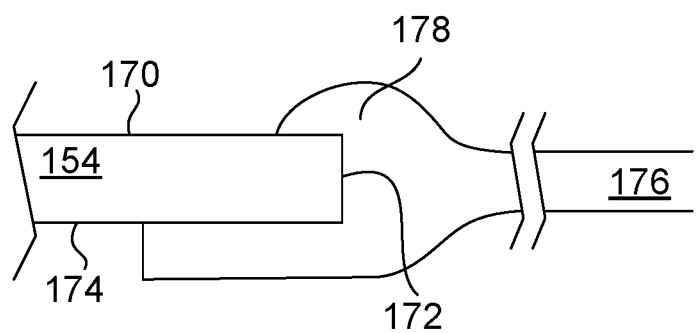
FIG. 14 illustrates a cross-sectional view of a polymeric supplemental bead type of three-sided bond; where top, bottom and edge surfaces engage corresponding portions of the housing filter window. Polymeric supplemental bead produces three-sided bond as well as performs the function of a stiffening member due to the increased thickness of polymeric material used in the bond.

In other embodiments section thicknesses (106, 108, and 110) are not all equal to each other. The section thicknesses (106, 108, and 110), including polymeric supplemental bead 178 shown in FIG. 14, are all examples of, and shall be considered stiffening members. Stiffening members typically provide additional rigidity, primarily due to their additional thickness. Any single member, sections 106, 108, 110), and polymeric supplemental bead 178 can be configured as a stiffening member by providing additional thickness, including any combination thereof, further including the embodiment where all are configured as stiffening members.

The inclusion of stiffening members, in predetermined locations, assist concave three panel assembly 100 function as a means for strain redirection, in mechanical cooperation with top section 12 and bottom 14 (depicted in FIG. 1).

Such stiffening member(s) features will result in enhanced sealing, for example, by increasing compressive pressure to user 2 from left-side section 16 and right-side section 18 when mechanically cooperating sections, i.e., top section 12 and bottom section 14 are in tension; and increasing compressive pressure to user 2 from top section 12 and bottom section 14 when left-side section 16 and the right-side section 18 are in tension. Additional details are delineated in FIGS. 1 and 14 and their corresponding discussions.

Figure 9:
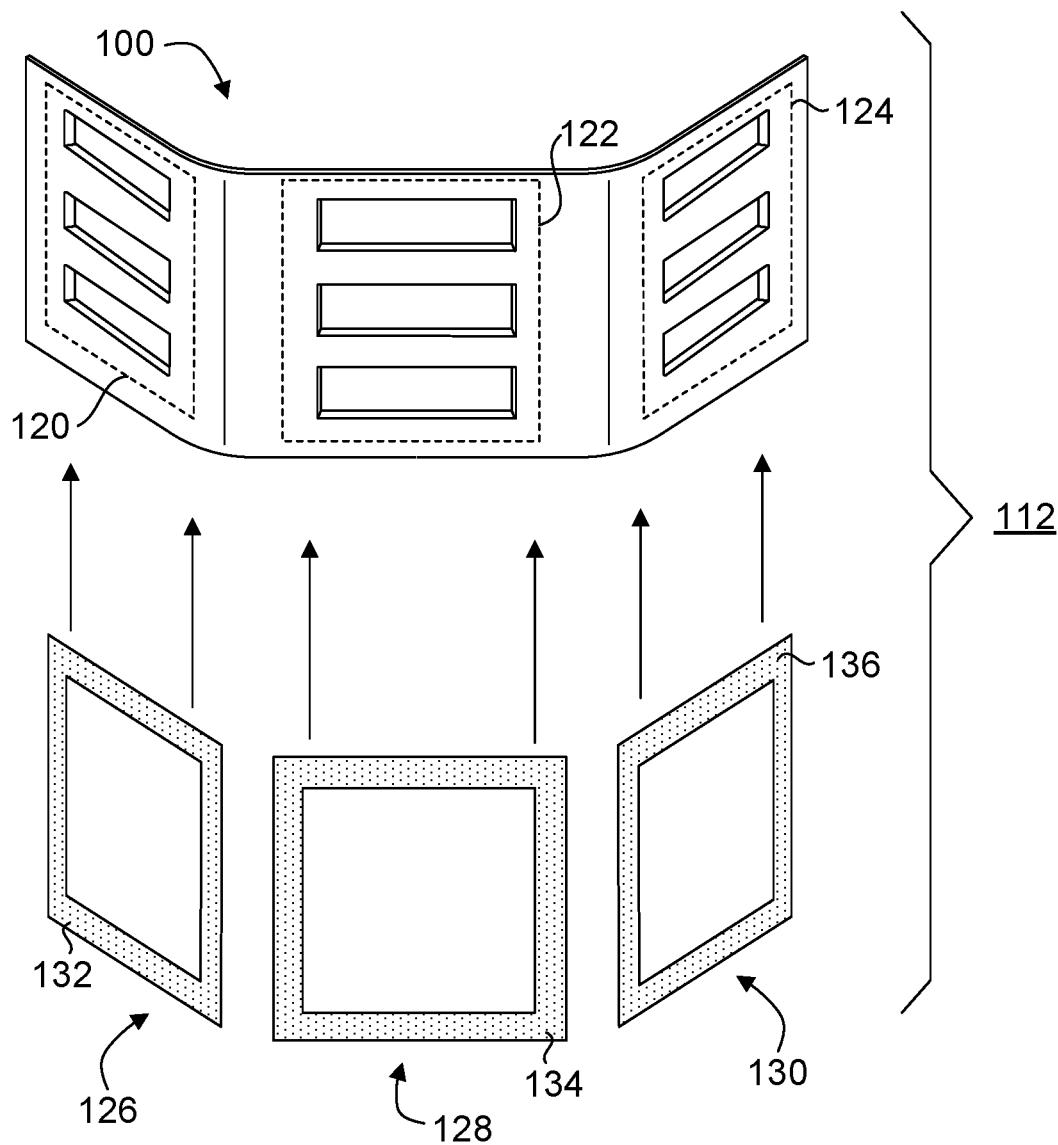
FIG. 9 illustrates a top-front detailed view of a concave three panel assembly, further depicting three separate filter components and their corresponding housing filter windows and corresponding attachment locations.

FIG. 9 depicts a three panel assembly and corresponding three filter components 112, and delineates a top-front detailed view of concave three panel assembly 100, further depicting three separate filter components: right filter component 126, front filter component 128, left filter component 130; and their respective corresponding housing filter windows: right-side filter window 120, front filter window 122, and left-side filter window 124. Each filter component includes a perimeter strip having an edge surface 172, which frames the filter component. In preferred embodiments, it is understood that if the bond between the perimeter strips and their corresponding housing filter windows is strengthened or ensured, then absolute filter component attachment to each individual aperture 54 is not required. This is because the filter perimeter strips encircle the plurality of apertures 54, such that all apertures are contained within each filter perimeter strip; accordingly, a gap-free hygienic barrier between user 2 and the user's external environment is ensured. It is understood that the strengthen bonds help the present mask system withstand spontaneous gap creation, typically induced by device aging or flexing.

The type of filter material selected for the three separate filter components: right filter component 126, front filter component 128, left filter component 130, are chosen based on the level of filtration required, expected life desired, and the like. For example, an N95 capable filter component should be selected, if N95 certification for a given mask embodiment is desired. This filter component selection process is recommended for all disclosed embodiments, such that mask embodiments will meet or exceed the requirements for a given application.

Figure 10:
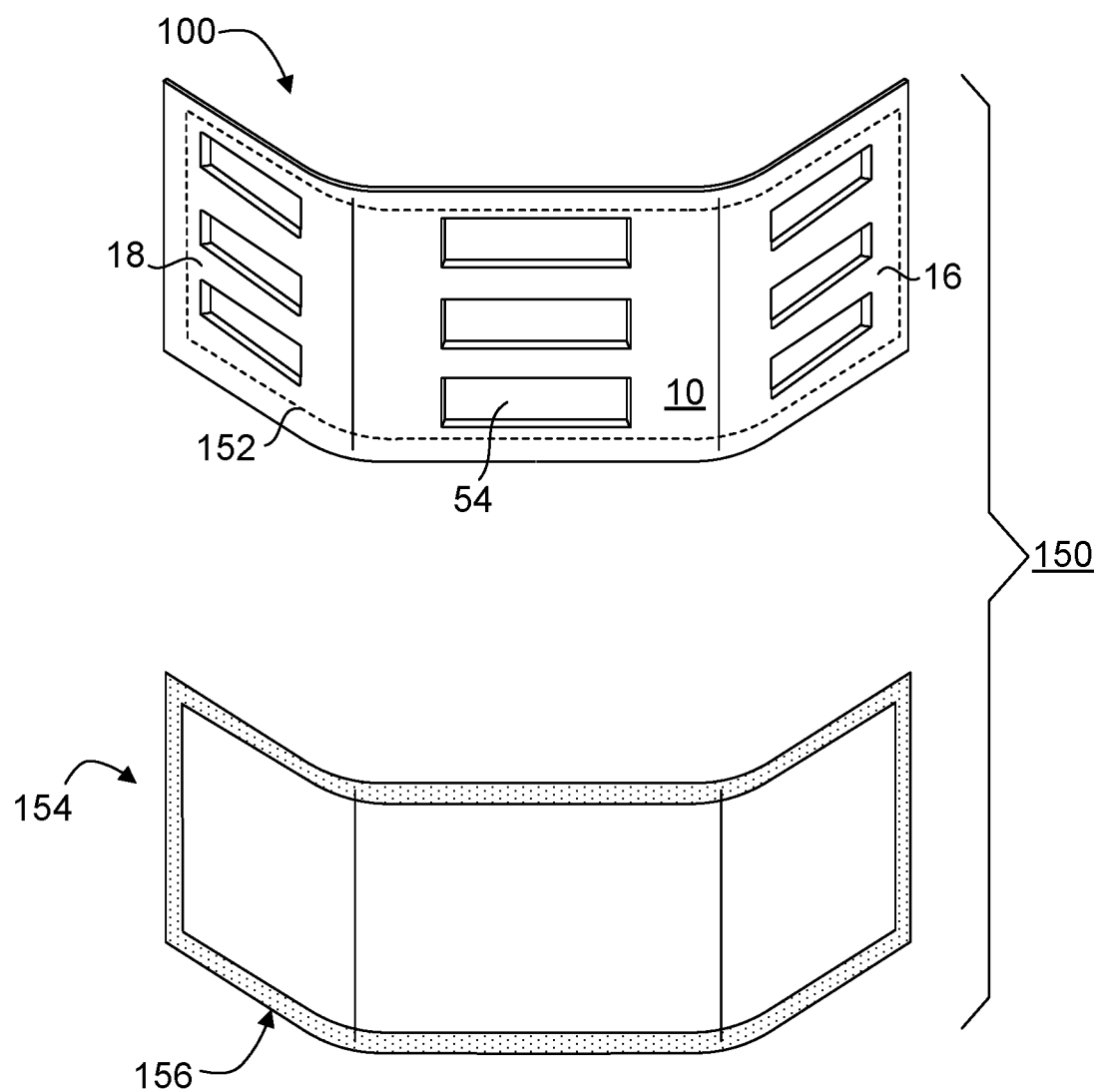
FIG. 10 illustrates a top-front detailed view of a concave three panel assembly, further depicting an elongated single filter component and corresponding housing filter window and attachment location.

FIG. 10 depicts a three panel assembly and corresponding elongated single filter component 150, and delineates a top-front detailed view of a concave three panel assembly, further depicting an elongated single filter component 154 and corresponding housing filter window 152. Assembly 150 is similar to the embodiment shown in FIG. 8, except the present embodiment incorporates elongated filter component 154, which encircles all housing filter windows: right-side filter window 120, front filter window 122, and left-side filter window 124, and in turn all the plurality of apertures 54 thereon. It is understood that the filter component member can vary in construction. In preferred embodiments the filter component is fabricated from a single layer of filtration material, in other embodiments the filter component can be constructed from two or more layers of filtration material. In multi-layered embodiments, it is recommended that the outer edge portions of each layer be fastened to each other, such that the multi-layered filtration material can be handled and processed as one single unit.

Elongated filter component 154 includes elongated filter perimeter strip 156, having an edge surface 172, which frames the filter component. Again, it is understood that if the bond between elongated filter component 154 and its corresponding elongated filter window 152 is strengthen or ensured, then absolute filter component attachment to each individual aperture 54 is not required. This is because elongated filter perimeter strip 156 encircles the all the plurality of apertures 54 on the device; accordingly, a gap-free hygienic barrier between user 2 and the user's external environment is ensured.

Figure 11:
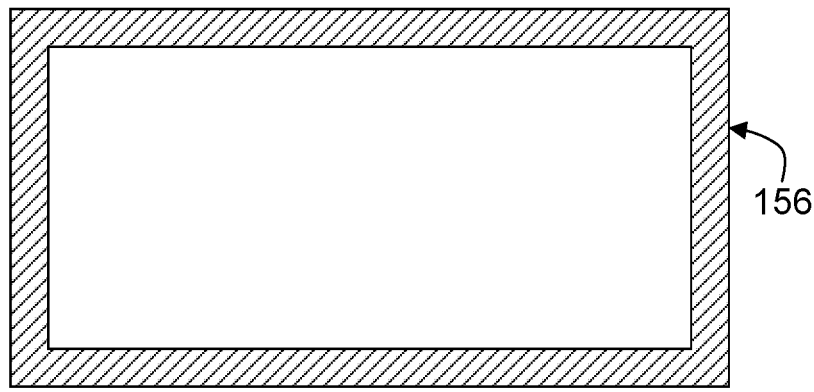
FIG. 11 illustrates a top view of an elongated filter component, further depicting the location of the filter perimeter strip.
Figure 12:
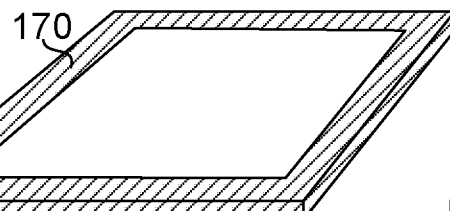
FIG. 12 illustrates a top-left detailed view of the top surface of the filter component shown in FIG. 11, further depicting details of the filter perimeter strip (showing top and edge portions).
Figure 13:
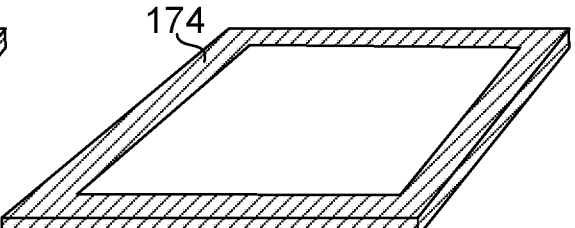
FIG. 13 illustrates a bottom-left detailed view of the bottom surface of the filter component shown in FIG. 11, further depicting details of the filter perimeter strip (showing bottom and edge portions).

FIG. 11 illustrates a top view of elongated filter component 154, previously depicted in FIG. 10, further depicting elongated filter perimeter strip 156 portion thereon. FIG. 12 depicts a top-edge perspective view of elongated filter component 154, primarily showing the top portion of filter component 154. FIG. 13 depicts a bottom-edge perspective view of elongated filter component 154, primarily showing the bottom portion of filter component 154.

FIG. 14 illustrates a cross-sectional view of a polymeric supplemental bead 178, a type of three-sided bond; where top surface 170, bottom surface 174, and edge surface 172 engage corresponding portions of housing filter window 176. In preferred fabrication processes, such as selective mold behind type injection molding processes, a three-sided bond can be designed into the device fabrication process. The supplemental bead 178, is considered a strengthening bond, producing an enhanced filter-housing seal, previously disclosed, which helps the mask system withstand spontaneous gap creation, typically induced by device aging or flexing. In addition to the supplemental bead 178 producing and enhanced filter-housing seal, the bond also functions as a stiffening member. The aforementioned function of a stiffening member is to participate in the strain redirection assembly detailed in the discussion associated with FIG. 2. Polymeric supplemental bead 178 simultaneously bonds to top surface 170, edge surface 172, and bottom surface 174 of elongated filter perimeter strip 156. In preferred embodiments the elongated filter perimeter strip 156 is deeply submerged into the polymeric material comprising polymeric supplemental bead 178, additionally the polymeric fibers comprising filter component 154 and polymeric material comprising polymeric supplemental bead 178 can be selected to possess similar melting points, so to activate additional bonding, or welding at the molecular level, further strengthening the interface.

Figure 15:
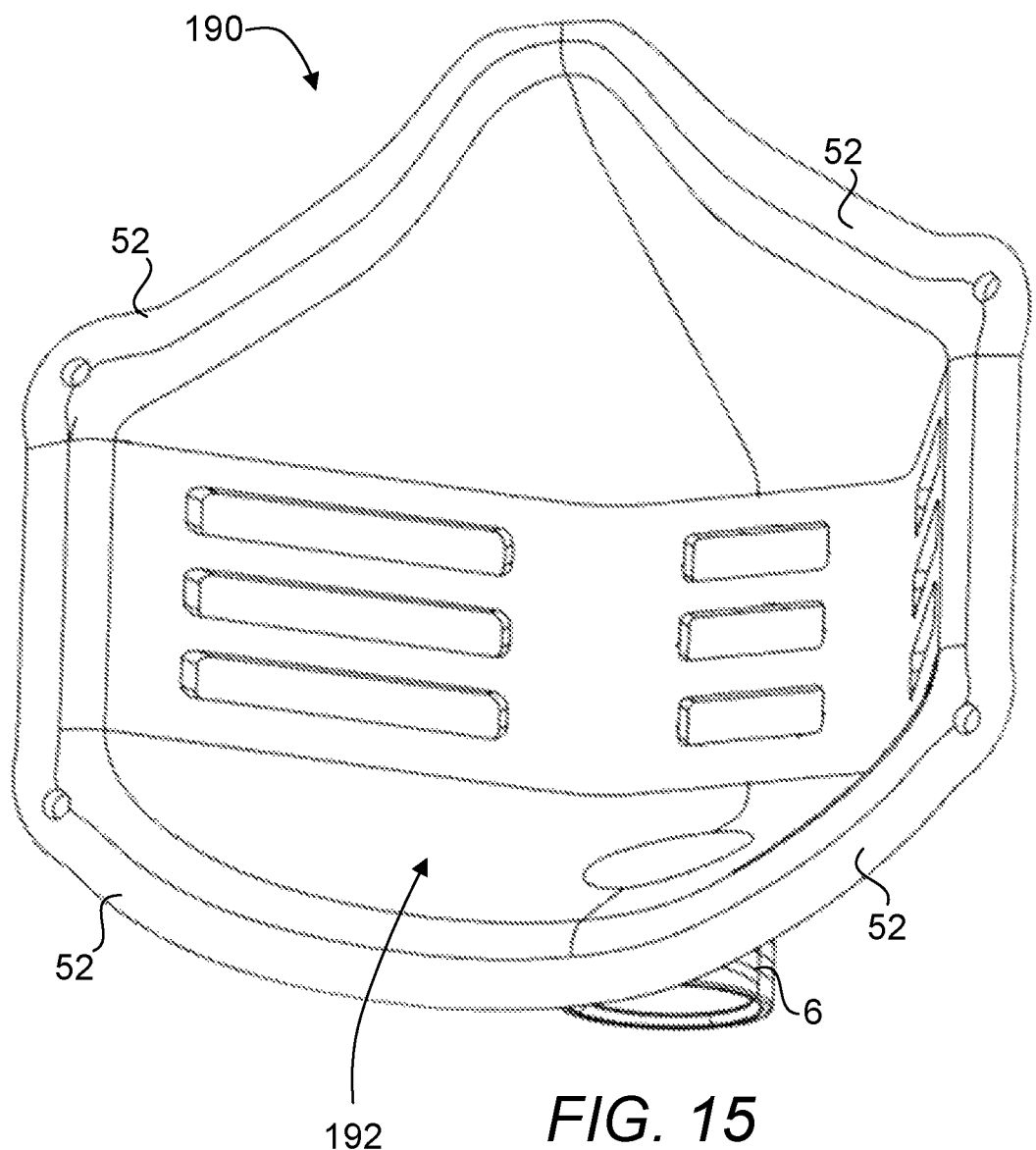
FIG. 15 illustrates a back-end perspective view of the multifunctional face mask system shown in FIG. 2. The illustration depicts an inner volume configured to receive a nebulizer medication.

FIG. 15 illustrates a back-end perspective view of the multifunctional face mask system shown in FIG. 2. Also depicted is full disclosure of outer edge perimeter 52. Back-end 190 depicts inner volume 192 configured to receive a nebulizer medication. In a fully functional face mask system, as depicted in FIG. 1, inner volume 192 creates a substantially sealed microenvironment when worn by user 2. The creation of the substantially sealed microenvironment within the face mask's inner volume provides a means for conserving a nebulizer medication by providing user 2 the opportunity to utilize the medication that would have normally been wasted.

Figure 16:
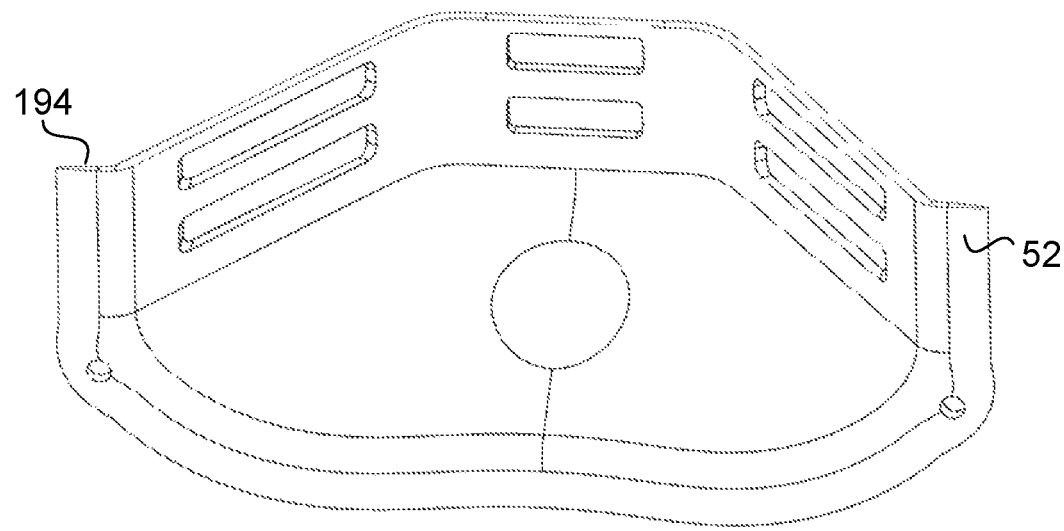
FIG. 16 illustrates a sectional, back-end view of the face mask system shown in FIG. 15, depicting an outboard flexible seal.

FIG. 16 illustrates a sectional back-end view of the face mask system shown in FIG. 15. Also illustrated is a portion of outer edge perimeter 52, further depicting an outboard flexible seal 194. In preferred embodiments, the thickness of outboard flexible seal 194 gradually tapers off as it extends outward. The thinner material portions, which are more flexible than neighboring thicker portions, reside at the extreme ends of outer edge perimeter 52, thereby providing enhanced sealing properties. Such a configuration provides a means for augmenting the face seal interface with user 2.

Figure 17:
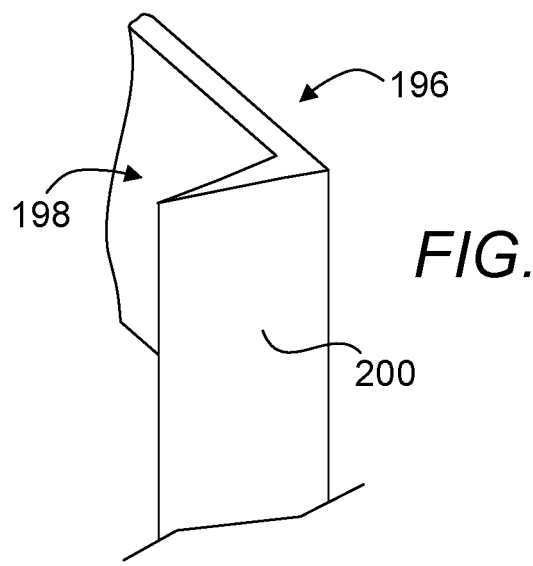
FIG. 17 illustrates a back-end sectional view of an embodiment of a face mask system depicting a portion of an inboard flexible seal.

FIG. 17 illustrates a back-end view of an embodiment of a face mask system depicting an inboard flexible seal 200. Depicted is mask housing 196 having an inner volume wall 198, from which inboard flexible seal 200 originates. Inboard flexible seal 200 curls inward toward the center of the given mask device, and in preferred embodiments the wall thickness gradually tapers off. One of the primary advantages of an inboard flexible seal 200, is that during exhalation by a user, the pressure created causes inboard flexible seal 200 to flex toward the user's face, thereby, via air pressure feedback, providing an enhanced seal.

Figure 18:
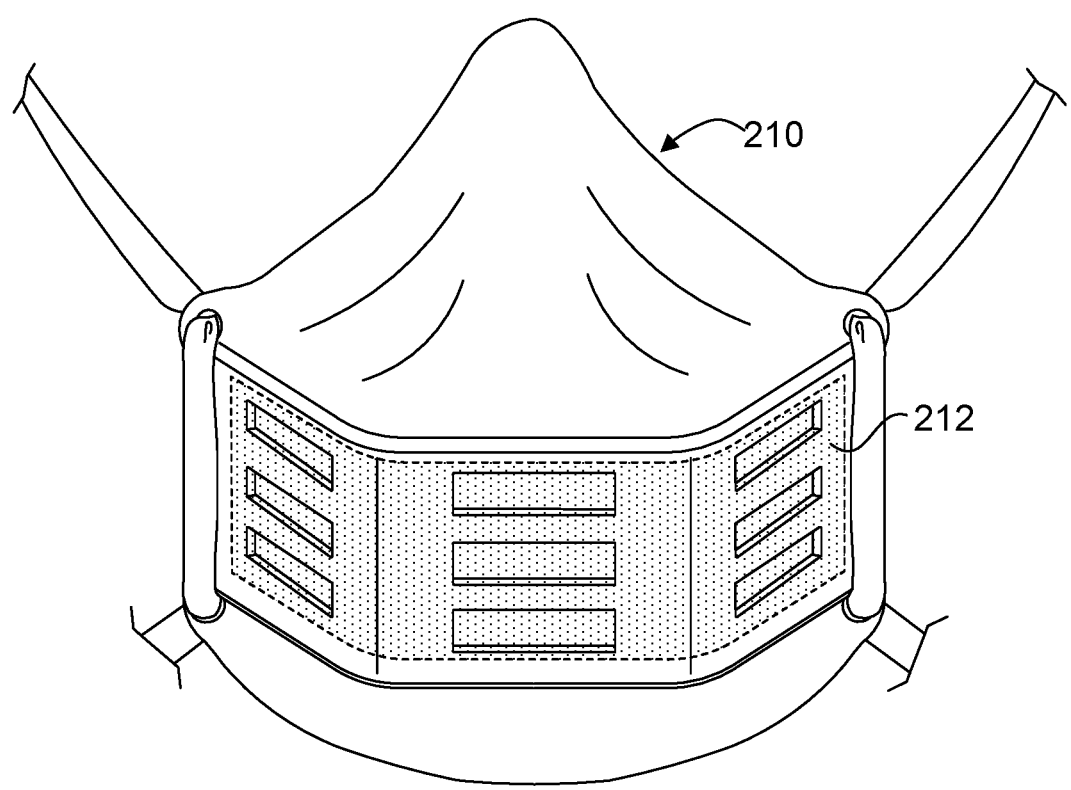
FIG. 18 illustrates a front perspective view of an embodiment of a face mask system including a filter component and configured without nebulizer capability.

FIG. 18 illustrates a front perspective view of an embodiment of basic face mask system 210 including a filter component 212. Basic face mask system 210 is configured without nebulizer capability and offers fundamental protection by providing a hygienic barrier between the user and the user's external environment. The system depicted in FIG. 18, and associated explanations are virtually identical to the system shown in FIG. 1, but without any nebulizer system type components included.

Figure 19:
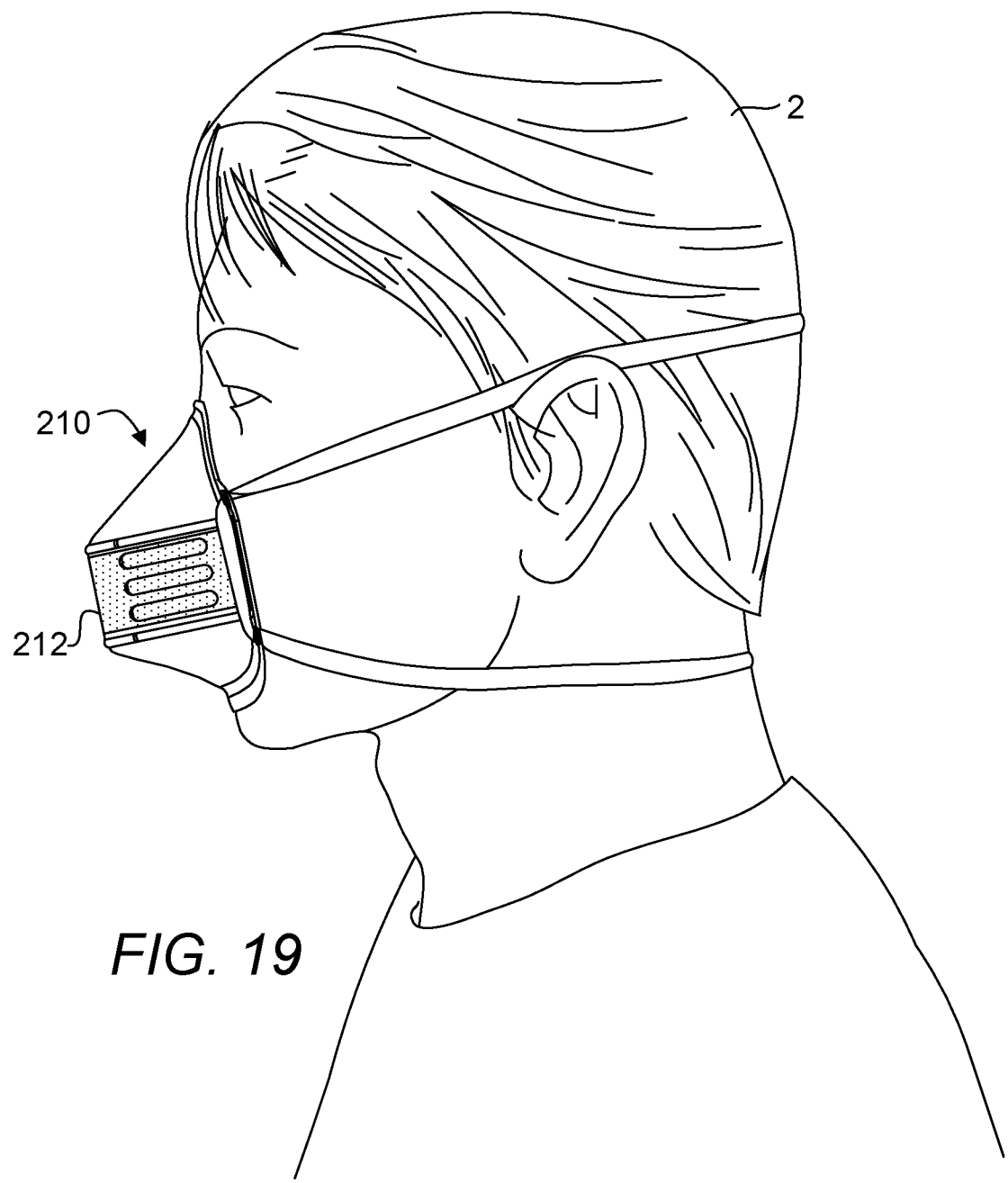
FIG. 19 illustrates a side perspective view of an embodiment of the face mask system shown in FIG. 18, affixed to a user. The illustration depicts a face mask system shown with a filter component attached.

FIG. 19 illustrates a side perspective view of the embodiment of basic face mask system 210, affixed to user 2. The illustration depicts basic face mask system 210 comprising an attached filter component 212. Basic face mask system 210 does not provide a means for delivering a nebulizer medication, and is used to provide a hygienic barrier between the user and their external environment via at least one filter component 212.

By way of example, but not limitation, typical thickness ranges are presented, accordingly: approximate range for polymeric supplemental bead 178 is between 2.5 mm and 3.5 mm; approximate range for top section 12 and bottom section 14 is between 0.5 mm and 1.75 mm; and the approximate range for right-side section 18, front section 10, and left-side section 16, when configured as a stiffening member, is between 2.0 mm and 3.0 mm.

What is claimed herein is:

1. A multifunctional face mask system configured for providing a hygienic barrier between a user and the user's external environment while the user is treated by a nebulizer medication, said multifunctional face mask system comprising:
   (a) a mask housing, fabricated from a polymeric material, and configured to interface with the user, said mask housing comprising:
      (i) a housing receptacle configured to receive a nebulizer system;
      (ii) a front section, a top section, a bottom section, a left-side section, a right-side section and a housing outer edge perimeter configured to sealingly engage a circumferential area about the user's nose and mouth;
      (iii) at least one filter window comprising at least one aperture, at least one filter component affixed to said at least one filter window using a selective mold-behind injection molding process during fabrication of said mask housing, said at least one filter component comprising a filter perimeter strip possessing a top surface, a bottom surface and a perimeter edge surface, wherein said bottom surface of said filter perimeter strip is overlaid across said at least one aperture, said polymeric material of said mask housing including a polymeric supplemental bead forming a three-sided bond by molecularly affixing said polymeric material to said top surface, said bottom surface, and said perimeter edge surface of said filter perimeter strip, thereby producing an enhanced seal between said mask housing and said at least one filter component; and
   (b) a right support strap and a left support strap, wherein said right support strap and said left support strap cooperate with said mask housing, said mask housing having sufficient rigidity such that said multifunctional face mask system is self-supporting when configured to be worn by the user.

2. The multifunctional face mask system of claim 1, wherein said mask housing further comprises a bottom edge configured to engage at least a portion of an upper chin area of the user to support a portion of said multifunctional face mask system's weight.

3. The multifunctional face mask system of claim 1, wherein said housing outer edge perimeter is fabricated as a flexible thin-walled lip, thereby configured to provide additional sealing between said mask housing and the user.

4. The multifunctional face mask system of claim 1, wherein said polymeric material is a material selected from the group consisting of an injection-moldable thermoplastic material, a thermoset material and any combination thereof.

5. The multifunctional face mask system of claim 1, wherein said polymeric material is a material selected from the group consisting of transparent, translucent, opaque and colored.

6. The multifunctional face mask system of claim 1, wherein said mask housing comprises a location for said housing receptacle that is selected from the group consisting of said front section and said bottom section.

7. The multifunctional face mask system of claim 6, wherein said nebulizer system is configured to be attached to said housing receptacle in a manner that is selected from the group consisting of removable attachment and permanent attachment.

8. The multifunctional face mask system of claim 1, wherein the nebulizer system is sealingly connected to said housing receptacle, enabling creation of a substantially sealed microenvironment within said multifunctional face mask system's inner volume, thereby conserving the nebulizer medication.

9. The multifunctional face mask system of claim 1, wherein said multifunctional face mask system is portable.

10. The multifunctional face mask system of claim 1, wherein said at least one filter component is fabricated from a material selected from the group consisting of a single layer of filtration material and a filtration composite having at least two distinct layers of filtration material.

11. The multifunctional face mask system of claim 1, further comprising a concave three panel assembly, integrated as part of said mask housing, comprising said left-side section, said front section, and said right-side section, wherein each of said sections is substantially planar, and are all contiguously adjoined, such that a left portion of said front section is attached to said left-side section via a first linking edge, and a right portion of said front section is attached to said right-side section via a second linking edge; said concave three panel assembly further comprises at least one stiffening member disposed at predetermined locations thereon.

12. The multifunctional face mask system of claim 11, wherein at least one panel of said concave three panel assembly comprises a thickness that is greater than said top section or said bottom section.

13. The multifunctional face mask system of claim 11, further comprising a strain redirection assembly comprising said concave three panel assembly coupled with said top section and said bottom section, in mechanical cooperation with said at least one stiffening member, configured such that said concave three panel assembly provides enhanced sealing by increasing compressive pressure to the user from said left-side section and said right-side section when said top section and said bottom section are in tension, and said strain redirection assembly is further configured such that said concave three panel assembly provides enhanced sealing by increasing compressive pressure to the user from said top section and said bottom section when said left-side section and said right-side section are in tension.

14. The multifunctional face mask system of claim 1, wherein said housing outer edge perimeter further comprises an inboard flexible seal or an outboard flexible seal.

15. The multifunctional face mask system of claim 1, wherein said right support strap is configured for producing a holding pressure along an outer vertical length of said right-side section, said left support strap is configured for producing a holding pressure along an outer vertical length of said left-side section and each of said support straps is elastic.

16. The multifunctional face mask system of claim 1, wherein said at least one filter window comprises a plurality of apertures and said filter perimeter strip encircles said plurality of apertures.

17. A face mask system configured for providing a hygienic barrier between a user and the user's external environment, said face mask system comprising:
- (a) a mask housing fabricated from an injection-moldable thermoplastic material, said mask housing comprising at least one filter window comprising at least one aperture, and at least one filter component comprising a top surface, a bottom surface and a perimeter edge surface, wherein said at least one filter component is molecularly bonded onto said at least one filter window using a selective mold-behind injection molding process during fabrication of said mask housing; said bottom surface of said filter perimeter strip is overlaid across said at least one aperture, such that said at least one filter component is suspended across said at least one aperture, and configured for providing air filtration; wherein said injection-moldable thermoplastic material engages all surfaces of said at least one filter component including said top surface, said bottom surface and said perimeter edge surface, thereby producing a three-sided bond to form an enhanced filter component-housing seal, wherein said three-sided bond is formed via a polymeric supplemental bead; and said mask housing further comprising a housing outer edge perimeter configured to sealingly engage a circumferential area about the user's nose and mouth; and
- (b) a right support strap and a left support strap, wherein said right support strap and said left support strap cooperate with said mask housing, said mask housing having sufficient rigidity such that said face mask system is self-supporting when configured to be worn by the user.

18. The face mask system of claim 17, wherein said at least one filter component is fabricated from a material selected from the group consisting of a single layer of filtration material and a filtration composite having at least two distinct layers of filtration material.

19. The face mask system of claim 17, wherein said mask housing is constructed from a material having a property selected from the group consisting of transparent, translucent, opaque and colored.

20. The face mask system of claim 17, wherein said at least one filter window comprises a plurality of apertures and said at least one filter component encircles all said plurality of apertures.

* * * * *